No. 618,524. Patented Jan. 31, 1899.
F. W. SHETTLEWORTH.
SAW FOR SAWING STONE.
(Application filed Dec. 27, 1897.)
(No Model.)

Witnesses
Florence H. Bragg
Caspar Simonds

Inventor
Frederick W. Shettleworth
By W. E. Simonds
Attorney

UNITED STATES PATENT OFFICE.

FREDERICK W. SHETTLEWORTH, OF PORTLAND, CONNECTICUT, ASSIGNOR OF ONE-HALF TO E. IRVING BELL, OF SAME PLACE.

SAW FOR SAWING STONE.

SPECIFICATION forming part of Letters Patent No. 618,524, dated January 31, 1899.

Application filed December 27, 1897. Serial No. 663,534. (No model.)

*To all whom it may concern:*

Be it known that I, FREDERICK W. SHETTLEWORTH, a citizen of the United States of America, residing at Portland, in the county of Middlesex and State of Connecticut, have invented a certain new and useful Improvement in Saws Especially Adapted for Sawing Stone, of which the following is a description, reference being had to the accompanying drawings, wherein—

Figure 1:
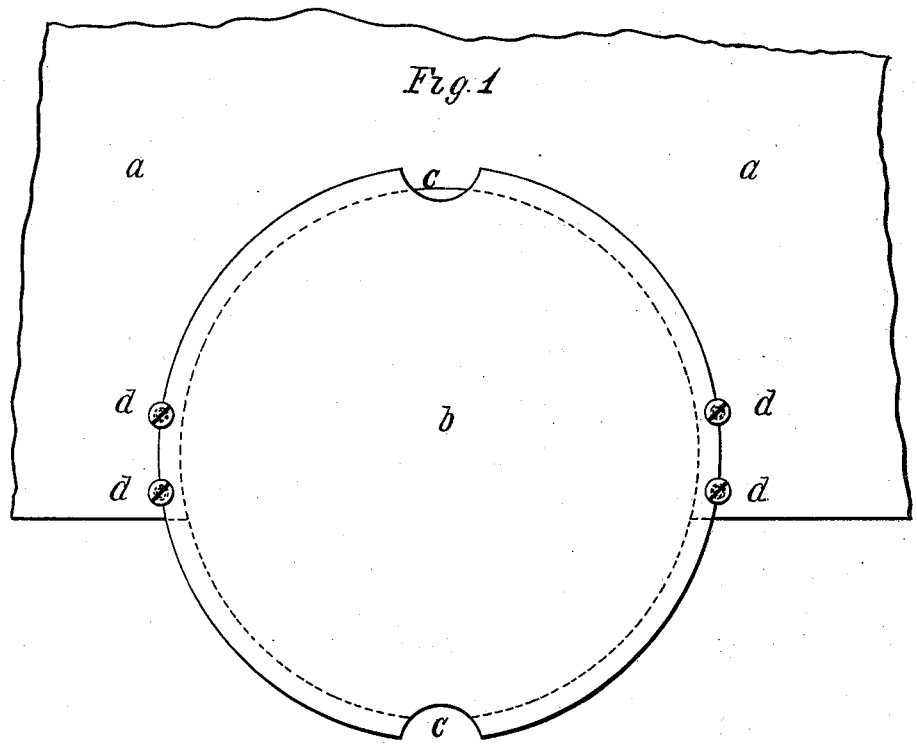
Figure 2:
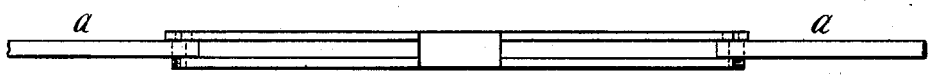

Figure 1 is a side view of a saw-tooth and a part of the blade embodying said improvement. Fig. 2 is an edge view of the same.

The nature of the improvement is indicated by its title. It is an improvement in saws specially adapted for sawing stone.

In the accompanying drawings the letter $a$ denotes the saw-blade, and $b$ a saw-tooth. The saw-blade has a tooth-seat—that is, a seat for the tooth—which in outline is a little greater than a half-circle, its open side or chord standing along the edge of the blade. The tooth is circular in outline. It is adapted to fit to and in said tooth-seat, and when in its seat it is made to interlock laterally with the blade by means of flanges formed by a peripheral groove. (Well seen in Fig. 2.) As the tooth-seat is a little greater than a half-circle in outline, it is obvious that some means must be adopted to enable the circular tooth to be introduced into that seat. These means consist of cutting away a portion or portions of the flanges, as at $c$, permitting the tooth to be introduced laterally into its seat when that tooth is in a certain position—that is, when the tooth is in such a position rotarily that these removed portions are in line with those parts of the tooth-seat which are in excess of the half-circle.

By means of the construction just described the tooth may be introduced into its seat. Then by rotating the tooth from that position, say, to the position shown in Fig. 1 the tooth is fast in its parti-circular seat. It can be kept locked in that position by the screws $d$.

When used for sawing or cutting stone, it may not be necessary to form other irregularities in the edge of the tooth than the cut-away portions $c$; but it will be evident that if the screw-sockets occupy corresponding positions on either side of the tooth the latter when dulled can be given a half-rotation, so as to bring its other edge into operative position, thus doubly prolonging the life of each tooth of the saw.

I claim as my improvement—

1. The combination with a saw-blade having in its edge a tooth-seat circular in outline and of a size slightly larger than half the circle; of a truly circular tooth of a size to accurately fit said seat and provided with radially-projecting peripheral side flanges larger than its body, said flanges being cut away at certain points, for the purpose set forth, and means for preventing rotation of the tooth within its seat, substantially as described.

2. The combination with a saw-blade having in its edge a tooth-seat circular in outline and of a size slightly larger than a half-circle; of a truly circular tooth with radial flanges at the sides of its body, the latter fitting said seat and the flanges overlapping the edges of the seat, the periphery of the tooth being cut away at certain points, for the purpose set forth, and means for preventing the rotation of the tooth when in either of a plurality of positions, substantially as described.

3. The combination with a saw-blade having in its edge a tooth-seat circular in outline and of a depth from the edge of the body slightly greater than a diameter of such circle; of a truly circular tooth whose body is of a size to fit the said seat, side flanges on the periphery of the body larger than the diameter of such body and cut away at diametrically opposite points for the purpose set forth, and devices equidistant from all such cut-away portions for fastening the tooth against rotation within the seat when in operative position.

FREDERICK W. SHETTLEWORTH.

Witnesses:
ASAPH H. HALE,
FREDERICK C. SOUTHMAYD.